United States Patent
Sekiya et al.

(10) Patent No.: US 8,165,536 B2
(45) Date of Patent: Apr. 24, 2012

(54) WIRELESS COMMUNICATION APPARATUS AND WIRELESS COMMUNICATION SYSTEM

(75) Inventors: Masahiro Sekiya, Fuchu (JP); Kiyoshi Toshimitsu, Yokohama (JP); Tetsu Nakajima, Yokohama (JP); Katsuya Nounin, Kawasaki (JP); Tsuguhide Aoki, Kawasaki (JP); Tomoya Tandai, Tokyo (JP); Tomoko Adachi, Urayasu (JP); Daisuke Takeda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1107 days.

(21) Appl. No.: 11/249,276

(22) Filed: Oct. 14, 2005

(65) Prior Publication Data

US 2006/0084461 A1 Apr. 20, 2006

(30) Foreign Application Priority Data

Oct. 18, 2004 (JP) ................................. 2004-303268

(51) Int. Cl.
*H03C 7/02* (2006.01)
(52) U.S. Cl. ...................... 455/101; 455/127.1; 455/132
(58) Field of Classification Search .................. 455/101, 455/127.1, 132–138
See application file for complete search history.

(56) References Cited

U.S. PATENT DOCUMENTS

| | | | |
|---|---|---|---|
| 6,407,993 B1 * | 6/2002 | Moulsley | 370/347 |
| 6,438,362 B1 * | 8/2002 | Amezawa | 455/226.3 |
| 2004/0029533 A1 | 2/2004 | Matsuo et al. | |
| 2004/0097204 A1 * | 5/2004 | Jung et al. | 455/132 |
| 2004/0147289 A1 * | 7/2004 | Paljug et al. | 455/562.1 |
| 2004/0229588 A1 * | 11/2004 | Cho | 455/278.1 |
| 2005/0287962 A1 * | 12/2005 | Mehta et al. | 455/101 |
| 2006/0068854 A1 * | 3/2006 | Sandhu | 455/574 |

FOREIGN PATENT DOCUMENTS

| | | |
|---|---|---|
| JP | 2713197 | 10/1997 |
| JP | 2002-77010 | 3/2002 |
| JP | 2003-332955 | 11/2003 |
| JP | 2004-194262 | 7/2004 |
| JP | 2005-33284 | 2/2005 |
| JP | 2006-42075 | 2/2006 |
| JP | 2008-504730 | 2/2008 |
| JP | 2008-507231 | 3/2008 |

* cited by examiner

*Primary Examiner* — Steven Lim

(74) *Attorney, Agent, or Firm* — Oblon, Spivak, McClelland, Maier & Neustadt, L.L.P.

(57) ABSTRACT

A wireless communication apparatus includes an M-number of (M is an integer of 2 or more) receiving portions connected to respective antennas, a frame analyzing section configured to analyze a reception signal received by the M-number of receiving portions, and a selecting section configured to select a receiving portion to be in service from the M-number of receiving portions. The selecting section selects a P-number of (P is an integer of from 0 to M) receiving portions from the M-number of receiving portions, based on an analysis result obtained by the frame analyzing section.

11 Claims, 10 Drawing Sheets

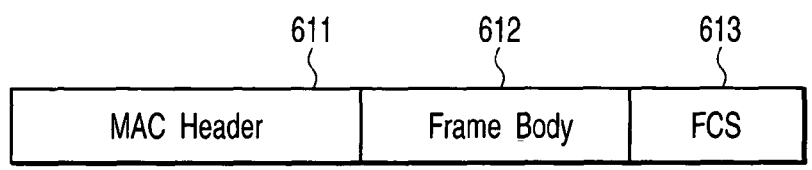
FIG. 5A  FIG. 5B  FIG. 5C
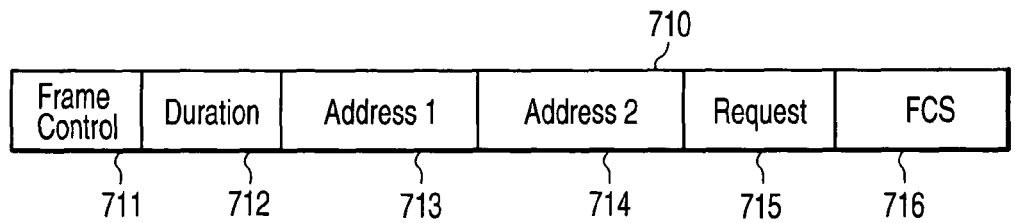
FIG. 6
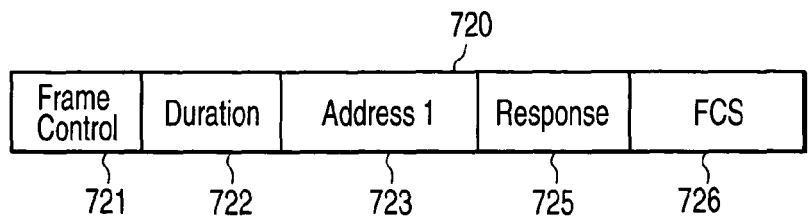
FIG. 7A
FIG. 7B

WIRELESS COMMUNICATION APPARATUS AND WIRELESS COMMUNICATION SYSTEM

CROSS-REFERENCE TO RELATED APPLICATIONS

This application is based upon and claims the benefit of priority from prior Japanese Patent Application No. 2004-303268, filed Oct. 18, 2004, the entire contents of which are incorporated herein by reference.

BACKGROUND OF THE INVENTION

1. Field of the Invention

The present invention relates to a wireless communication apparatus and wireless communication system, and particularly to a technique for reducing the power consumption in a wireless communication apparatus and wireless communication system including a plurality of transmitting portions and/or receiving portions.

2. Description of the Related Art

In recent years, personal computers, portable information terminals, wireless liquid crystal televisions, etc., are widely used, with which the number of wireless LAN (LAN: Local Area Network) systems that form wireless networks for transmitting information are increasing. Currently, as a wireless LAN system standardized by IEEE 802.11, IEEE 802.11b of 2.4 GHz band is prevalent. In addition, IEEE 802.11a of 5 GHz band, which allows communication with higher speed, is also gradually becoming prevalent, with increasing demands on high-speed communication.

Further, as a technique for realizing high-speed wireless communication, there is a transmission method called MIMO (MIMO: Multiple Input Multiple Output). According to this MIMO technique, encoded information to be transmitted is divided into a plurality of data streams, which are then transmitted by a plurality of antennas at the same time and on the same frequency channel. In this manner, a large amount of data can be transmitted on a single frequency channel, thereby supposedly realizing high-speed transmission in wireless communication systems.

BRIEF SUMMARY OF THE INVENTION

According to a first aspect of the present invention, there is provided a wireless communication apparatus comprising:

an M-number of (M is an integer of 2 or more) receiving portions connected to respective antennas;

a frame analyzing section configured to analyze a reception signal received by the M-number of receiving portions; and a selecting section configured to select a receiving portion to be in service from the M-number of receiving portions, wherein the selecting section selects a P-number of (P is an integer of from 0 to M) receiving portions from the M-number of receiving portions, based on an analysis result obtained by the frame analyzing section.

According to a second aspect of the present invention, there is provided a wireless communication apparatus comprising:

an N-number of (N is an integer of 2 or more) transmitting portions connected to respective antennas;

a frame analyzing section configured to analyze a transmission signal to be transmitted by the N-number of transmitting portions; and a selecting section configured to select a transmitting portion to be in service from the N-number of transmitting portions, wherein the selecting section selects a Q-number of (Q is an integer of from 0 to N) transmitting portions from the N-number of transmitting portions, based on an analysis result obtained by the frame analyzing section.

According to a third aspect of the present invention, there is provided a wireless communication apparatus comprising:

an X-number of (X is an integer of 1 or more) receiving portions connected to respective antennas;

a Y-number of (Y is an integer of 1 or more to satisfy X+Y being an integer of 3 or more) transmitting portions connected to respective antennas;

a frame analyzing section configured to analyze a reception signal received by the X-number of receiving portions and a transmission signal to be transmitted by the Y-number of transmitting portions; and a selecting section configured to select a receiving portion to be in service from the X-number of receiving portions, and to select a transmitting portion to be in service from the Y-number of transmitting portions, wherein the selecting section selects a P-number of (P is an integer of from 0 to X) receiving portions from the X-number of receiving portions, and selects a Q-number of (Q is an integer of from 0 to Y) transmitting portions from the Y-number of transmitting portions, based on an analysis result obtained by the frame analyzing section.

According to a fourth aspect of the present invention, there is provided a wireless communication system including first and second wireless communication apparatuses, wherein:

the first wireless communication apparatus comprises an N-number of (N is an integer of 2 or more) transmitting portions connected to respective antennas, a frame analyzing section configured to analyze a transmission signal to be transmitted by the N-number of transmitting portions, and a selecting section configured to select a Q-number of (Q is an integer of from 0 to N) transmitting portions from the N-number of transmitting portions, based on an analysis result obtained by the frame analyzing section; and the second wireless communication apparatus comprises an M-number of (M is an integer of 2 or more) receiving portions connected to respective antennas, a frame analyzing section configured to analyze a reception signal received by the M-number of receiving portions, and a selecting section configured to select a P-number of (P is an integer of from 0 to M) receiving portions from the M-number of receiving portions, based on an analysis result obtained by the frame analyzing section.

BRIEF DESCRIPTION OF THE SEVERAL VIEWS OF THE DRAWING

FIG. 5A is a view showing an example of information collection concerning the number of antennas of each wireless terminal according to the first embodiment, and FIGS. 5B and 5C are views showing examples for setting the number of antennas to be in service;

FIG. 6 is a view showing an example of the configuration of an MAC frame in an IEEE 802.11 wireless LAN system;

FIGS. 7A and 7B are views showing examples of a wireless-function service request frame and a wireless-function service response frame, respectively, according to the first embodiment;

DETAILED DESCRIPTION OF THE INVENTION

Figure 1:
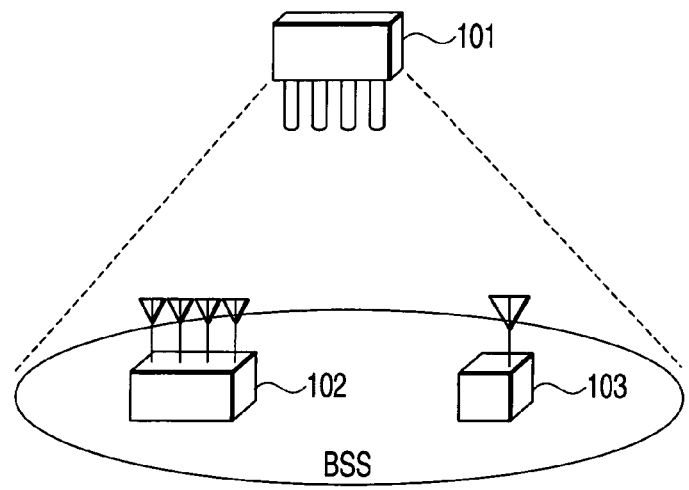
FIG. 1 is a view showing an example of the communication formation of an IEEE 802.11 wireless LAN system.

In the process of developing the present invention, the inventors studied conventional wireless communication techniques, such as the MIMO technique. As a result, the inventors have arrived at the findings given below.

Specifically, where the MIMO technique is used for high-speed wireless transmission, it is necessary to configure a wireless communication apparatus having a plurality of transmitting portions, receiving portions, and antennas. If the transmitting portions and receiving portions are always in service for wireless communication, all the transmitting portions and receiving portions have to be set in the ON-state. However, it is not necessarily true that wireless communication is performed using all the transmitting portions and receiving portions. For example, when there is a request to transmit or receive a large amount of data, a plurality of transmitting portions and/or receiving portions may have to be turned on, while, when a small amount of data is handled, only one of the transmitting portions and one of the receiving portions may have to be turned on. In this communication requiring only one transmitting portion and one receiving portion to be in service, if the other transmitting portions and receiving portions out of service are set in the ON-state, it is wasteful in terms of power consumption efficiency. Power consumption efficiency is a particularly important issue for portable information terminals that normally operate on batteries, and personal computers and liquid crystal televisions that operate on batteries.

Further, in the future, a plurality of wireless communication apparatuses each having a plurality of transmitting portions, receiving portions, and antennas may form a wireless communication system, in cooperation with a plurality of wireless communication apparatuses arranged in compliance with the IEEE 802.11a standard currently prevalent. In such a system, when a wireless communication apparatus having transmitting portions and receiving portions communicates with an IEEE 802.11a wireless communication apparatus, only one of transmitting portions and one of receiving portions will be set in service for communication. On the other hand, when wireless communication apparatuses each having transmitting portions and receiving portions communicate with each other, a plurality of transmitting portions and receiving portions may be set in service for communication in accordance with a request. However, there is no specific method for deciding when and how a wireless communication apparatuses having transmitting portions and receiving portions performs communication, with two or more transmitting portions and two or more receiving portions set in service.

Furthermore, when a wireless communication apparatus having transmitting portions and receiving portions transmits data, with two or more transmitting portions and two or more receiving portions set in service, the wireless communication apparatus arranged in compliance with IEEE 802.11a cannot comprehend the data. In this case, some information contained in the data may not be transmitted to the IEEE 802.11a wireless communication apparatus, thereby causing problems in the wireless LAN system. Thus, for example, where wireless communication apparatuses each having transmitting portions and receiving portions coexist with currently prevalent wireless communication apparatuses in a wireless communication system, units of data transmitted by respective wireless communication apparatuses may cause collision.

In light of this problem, the present inventors have found that the following countermeasure is effective in improving a wireless communication technique with the situation described above. Specifically, at first, the number of transmitting portions, receiving portions, and antennas are selected, and the transmitting portions and receiving portions to be out of service are set in the OFF-state (the power supplies are turned off), in accordance with the propagation path situation, and the amount of data and the number of data streams to be transmitted. Further, the number of transmitting portions, receiving portions, and antennas to be in service are selected, and only the transmitting portions and receiving portions to be in service are set in the ON-state (the power supplies are turned on) on the basis of information provided in a reception frame (signal). With this arrangement, it is possible to perform power supply control in accordance with a requested quality, and thus to provide a wireless communication apparatus that can control wireless communication while reflecting the communication situation and realizing lower power consumption.

Embodiments of the present invention achieved on the basis of the findings given above will now be described with reference to the accompanying drawings.

First Embodiment

According to the first embodiment, a destination wireless communication apparatus having a plurality of transmitting portions and receiving portions selects a transmitting portion and receiving portion to be turned on the basis of information provided in an information signal transmitted by a sender wireless communication apparatus. The destination wireless communication apparatus provides the selection result in a transmission frame (signal) and makes a response to the sender wireless communication apparatus.

FIG. 1 is a view showing an example of the communication formation of an IEEE 802.11 wireless LAN system. In FIG. 1, one wireless base station (wireless communication apparatus) 101 is in wireless connection with a plurality of wireless terminals (wireless communication apparatuses) 102 and 103. This community formed of the wireless base station and wireless terminals is called BSS (BSS: Basic Service Set) in accordance with IEEE 802.11.

Figure 2:
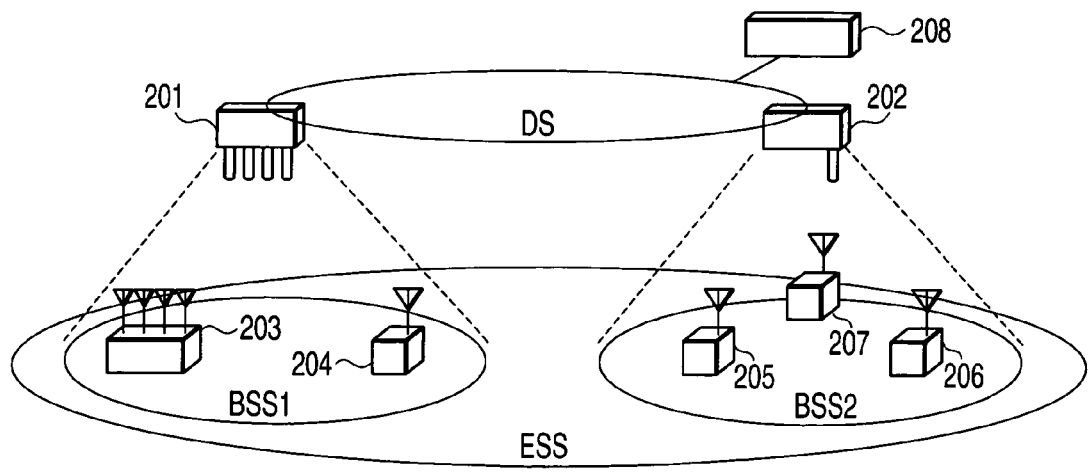
FIG. 2 is a view showing an example of the communication formation of an IEEE 802.11 wireless LAN system consisting of a plurality of BSSs.

FIG. 2 is a view showing an example of the communication formation of an IEEE 802.11 wireless LAN system consisting of a plurality of BSSs. In FIG. 2, a first community BSS1 is formed of one wireless base station (wireless communication apparatus) 201 and a plurality of wireless terminals (wireless communication apparatuses) 203 and 204 in wireless connection with each other. Further, a second community BSS2 is formed of one wireless base station (wireless communication apparatus) 202 and a plurality of wireless terminals (wireless communication apparatuses) 205 and 206 in wireless connection with each other. The first community BSS1 and second community BSS2 are connected by wire or wireless, and a terminal 208 further connected thereto by wire.

The wireless communication system formation shown in FIG. 2 is called ESS (ESS: Extended Service Set) in accordance with IEEE 802.11. The relationship between the wireless base stations is called DS (DS: Distributed System), which may be connected by wire or wireless.

In the BSS shown in FIG. 1, the wireless base station 101 and wireless terminal 102 each having a plurality of antennas, transmitting portions, and receiving portions coexist with the wireless terminal 103 having a single antenna, and a transmitting portion and a receiving portion corresponding thereto. The first embodiment will be explained with reference to the wireless communication system formation shown in FIG. 1.

Figure 3:
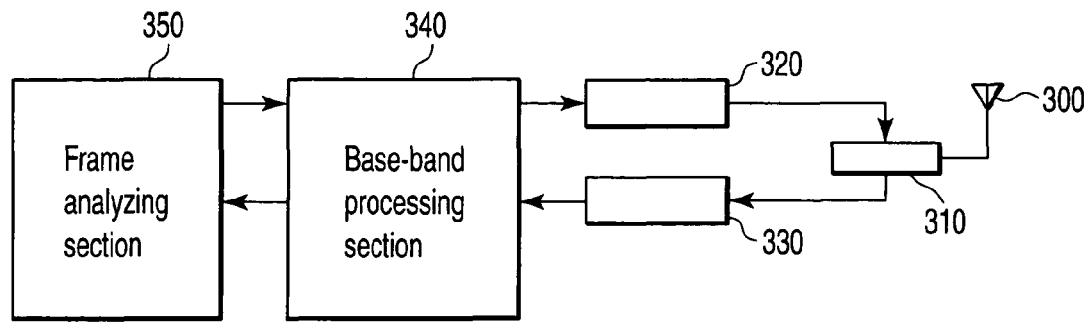
FIG. 3 is a view showing an example of the configuration of a wireless communication apparatus having a single antenna, arranged in compliance with IEEE 802.11 (also including IEEE 802.11a)

FIG. 3 is a view showing an example of the configuration of a wireless communication apparatus having a single antenna, arranged in compliance with IEEE 802.11 (also including IEEE 802.11a). The wireless communication apparatus shown in FIG. 3 has a transmitting portion 320 and a receiving portion 330 both connected to an antenna 300 through a branching unit 310. The transmitting portion 320 and receiving portion 330 are connected to a frame analyzing section 350 through a base-band processing section 340.

Figure 4:
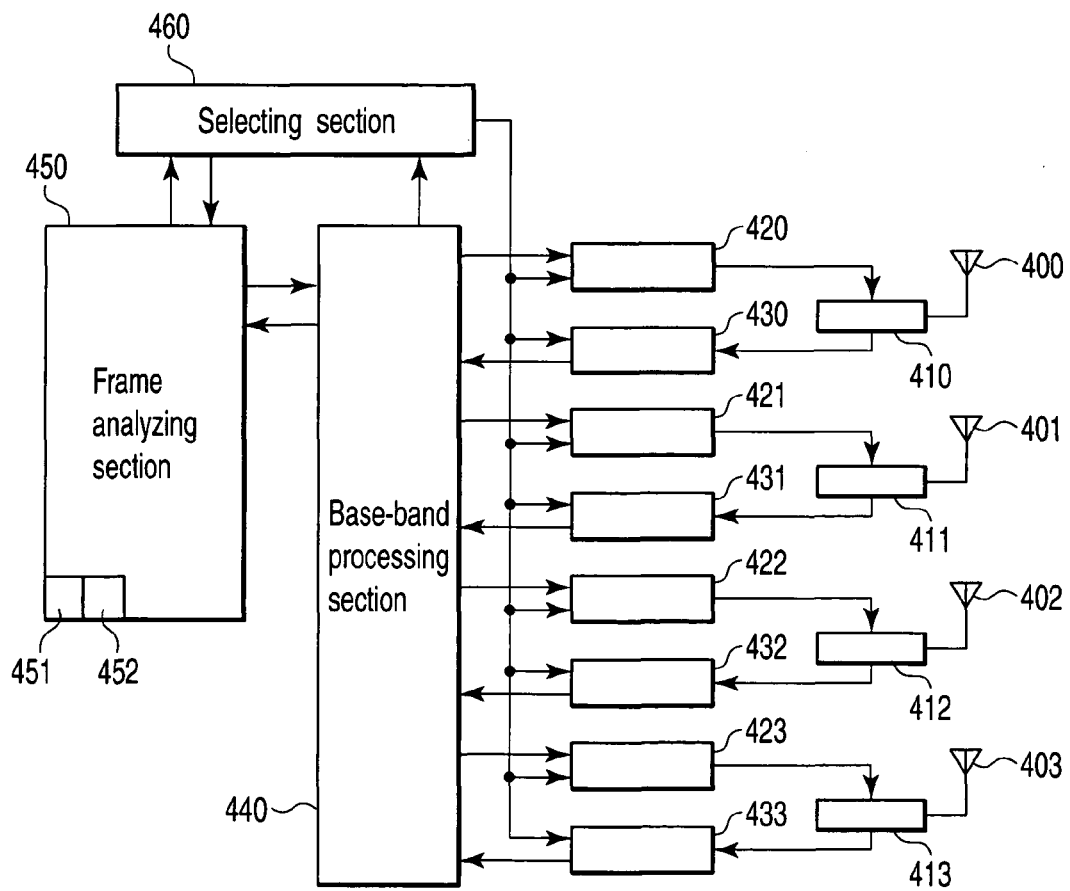
FIG. 4 is a view showing an example of the configuration of a wireless communication apparatus according to a first embodiment of the present invention.

FIG. 4 is a view showing an example of the configuration of a wireless communication apparatus according to the first embodiment of the present invention. The wireless communication apparatus shown in FIG. 4 has a plurality of pairs of transmitting portions 420 to 423 and receiving portions 430 to 433 connected to a plurality of antennas 400 to 403, through branching units 410 to 413, respectively. The transmitting portions 420 to 423 and receiving portions 430 to 433 are connected to a frame analyzing section 450 configured to analyze transmission signal frames and reception signal frames, through a base-band processing section 440 configured to process transmission signals and reception signals.

The frame analyzing section 450 has a frame information analyzing portion 451 configured to analyze information provided in frames, and a frame address discriminating portion 452 configured to discriminate frame addresses. The base-band processing section 440 and frame analyzing section 450 are connected to a selecting section 460 configured to select the transmitting portions and receiving portions. The selecting section 460 selects a transmitting portion (or portions) and a receiving portion (or portions) to be in service from the transmitting portions 420 to 423 and receiving portions 430 to 433 on the basis of information analyzed by the frame information analyzing portion 451 and discrimination result made by the frame address discriminating portion 452.

In the wireless communication system shown in FIG. 1, the wireless base station 101 having four antennas, the wireless terminal 102 having four antennas, and the wireless terminal 103 having one antenna coexist in the same BSS. For example, each of the wireless base station 101 and wireless terminal 102 has a communication apparatus configuration, as shown in FIG. 4, while the wireless terminal 103 has a communication apparatus configuration, as shown in FIG. 3.

An explanation will be given of an embodiment where the wireless base station 101 communicates with the wireless terminals within the same BSS. It should be noted that, where a function block of a wireless communication apparatus belongs to the wireless base station 101, the corresponding reference number of the function block shown in FIG. 4 is denoted with "A" at the end. Further, where a function block of a wireless communication apparatus belongs to the wireless terminals, the corresponding reference number is denoted with "S" at the end. For example, the base-band processing section 440 of the wireless base station 101 is denoted as "base-band processing section 440A."

When the wireless base station 101 transmits information to the wireless terminal 103, the wireless base station 101 causes only a pair of transmitting portion 420A and receiving portion 430A to be set in the ON-state, as well as the base-band processing section 440A and frame analyzing section 450A being set in the ON-state. At this time, the other transmitting portions 421A to 423A and receiving portions 431A to 433A are set in the OFF-state. In other words, only the antenna 400A and branching unit 410A are set in service, while the other antennas and branching units are set out of service, to realize the same function as the apparatus configuration of the wireless terminal 103 shown in FIG. 3. With this arrangement, the wireless base station 101 can perform wireless communication with the wireless terminal 103.

On the other hand, when the wireless base station 101 transmits information to the wireless terminal 102, the procedures are as follows. Specifically, the wireless base station 101 stores information written in a reception frame from the wireless terminal 102, and determines on the basis thereof, whether communication using a plurality of antennas is possible with the wireless terminal 102. For example, according to IEEE 802.11 wireless LAN systems, MAC (MAC: Medium Access Control) frames transmitted and received by a wireless base station or wireless terminal can be categorized into three types, i.e., data frames, management frames, and control frames. A wireless-function setting request frame for selecting receiving portions, transmitted from the wireless base station, may be one of control frames, management frames, and data frames of IEEE 802.11 MAC frames. According to the first embodiment, for example, the wireless base station performs information collection, using one type of management frames.

The wireless base station 101 collects information concerning the number of antennas of a wireless terminal, when it receives an association request for certification from the wireless terminal or at another time. FIG. 5A is a view showing an example of information collection concerning the number of antennas of each wireless terminal according to the first embodiment. As shown in FIG. 5A, the number of antennas of each wireless terminal is stored in a file 501 (501A) (in this embodiment, one antenna is connected to one transmitting portion and one receiving portion).

FIGS. 5B and 5C are views showing examples for setting the number of antennas to be in service. According to the example shown in FIG. 5B, the number of antennas to be in service is set in a file 502 (502A) in accordance with the type of each of transmission and reception frames (such as Data, ACK (acknowledgement), and RTS (RTS: Request To Send) frames for IEEE 802.11 wireless systems). According to the example shown in FIG. 5C, the number of antennas to be in service is set in a file 503 (503A) in accordance with the content of information (audio, video, image, etc.) handled in frame interchange.

According to the example shown in FIG. 5A, when the wireless base station 101 uses a plurality of antennas to transmit information data to the wireless terminal 102, the wireless base station 101, i.e., the sender, knows in advance that the wireless terminal 102, i.e., the destination, can perform reception using four antennas. Accordingly, the wireless base station 101 transmits a wireless-function service request frame for requesting preparation of reception using four antennas to the destination wireless terminal 102. When the destination wireless terminal 102 receives the wireless-function service request frame, it confirms request information shown in the wireless-function service request frame. If the destination wireless terminal can perform reception using four antennas, the destination wireless terminal provides information representing service agreement in a wireless-function service response frame, and transmits it to the sender wireless base station.

In order to realize the information interchange described above, the wireless-function service request frame and wireless-function service response frame transmitted and received by the wireless base station 101 and wireless terminal 102 may be formed of one type of IEEE 802.11 MAC frames. FIG. 6 is a view showing an example of the configuration of an MAC frame in an IEEE 802.11 wireless LAN system. This MAC frame consists of a header portion (MAC Header) 611 provided with information necessary for reception processing; a body portion (Frame Body) 612 provided with information corresponding to the type of frame (such as data from a higher layer); and a check portion FCS (FCS: Frame Check Sequence) 613 formed of a CRC (Cyclic Redundancy Code) used for discriminating whether the header portion 611 and body portion 612 have been accurately received.

The header portion 611 includes a frame control field (Frame Control) provided with a value corresponding to the type of frame; a duration field (Duration/ID) showing a time period during which transmission is inhibited (NAV: Network Allocation Vector); a plurality of MAC address fields provided with a direct transmission address, final address, and/or sender MAC address; and a sequence control field provided with the sequence number of transmission data and/or the fragment number of fragmented data. The frame control field includes a type field and a sub-type field showing the type of frame; a "To-DS" bit showing transmission to DS (i.e., to the wireless base station); and a "From-DS" bit showing transmission from DS (i.e., from the wireless base station).

FIG. 7A is a view showing an example of the wireless-function service request frame (ReF) 710 used in the first embodiment, wherein this MAC frame 710 additionally includes a request field (Request). Specifically, the ReF 710 includes a frame control field 711, a duration field (Duration) 712, a first address field (Address 1) 713, a second address field (Address 2) 714, a request field (Request) 715, and a check field (FCS) 716. The frame control field 711 includes type and sub-type fields showing the type of frame, with which this frame can be recognized as a wireless-function service request frame.

The first address field 713 shows the MAC address of a destination (the MAC address of the wireless terminal 102 in this embodiment). The second address field 714 shows the MAC address of a sender (the MAC address of the wireless base station 101 in this embodiment). Accordingly, with the first address field 713, the wireless terminal 102 can discriminate the reception frame as a frame directed to itself. Further, with the second address field 714, the wireless terminal 102 can recognize the MAC address of the wireless base station 101 or sender.

When a wireless terminal other than the wireless terminal 102 receives this frame, it can recognize this reception frame as being directed to another, because the MAC address shown in the first address field 713 differs from its own MAC address. This wireless terminal other than the wireless terminal 102 has to take on standby without performing transmission for a time period corresponding to a value provided in the duration field 712 of the ReF 710.

The request field 715 of the ReF 710 is provided with information as to whether there is a request for preparation of reception using four antennas. In this embodiment, if the request field 715 is provided with "1," it requests reception using four antennas. If the request field 715 is provided with "0," it requests reception using one antenna.

FIG. 7B is a view showing an example of the wireless-function service response frame (AnF) 720 used in the first embodiment, wherein this MAC frame 720 additionally includes a response field (Response). Specifically, the AnF 720 includes a frame control field 721, a duration field 722, an address field 723, a response field 725, and a check field (FCS) 726. The frame control field 721 includes type and sub-type fields showing the type of frame, with which this frame can be recognized as a wireless-function service response frame.

The address field 723 shows the same MAC address as the second address field 714 of the ReF 710 (the MAC address of the wireless base station 101 in this embodiment). The duration field 722 is provided with a value obtained by subtracting the time period necessary for transmitting the AnF 720 from the value shown in the duration field 712 of the ReF 710. The response field 725 is provided with a response to the request shown in the request field 715 of the ReF 710. In this embodiment, if the request shown in the request field 715 is accepted, the response field 725 is provided with "1." If the request is rejected, the response field 725 is provided with "0."

Figure 8:
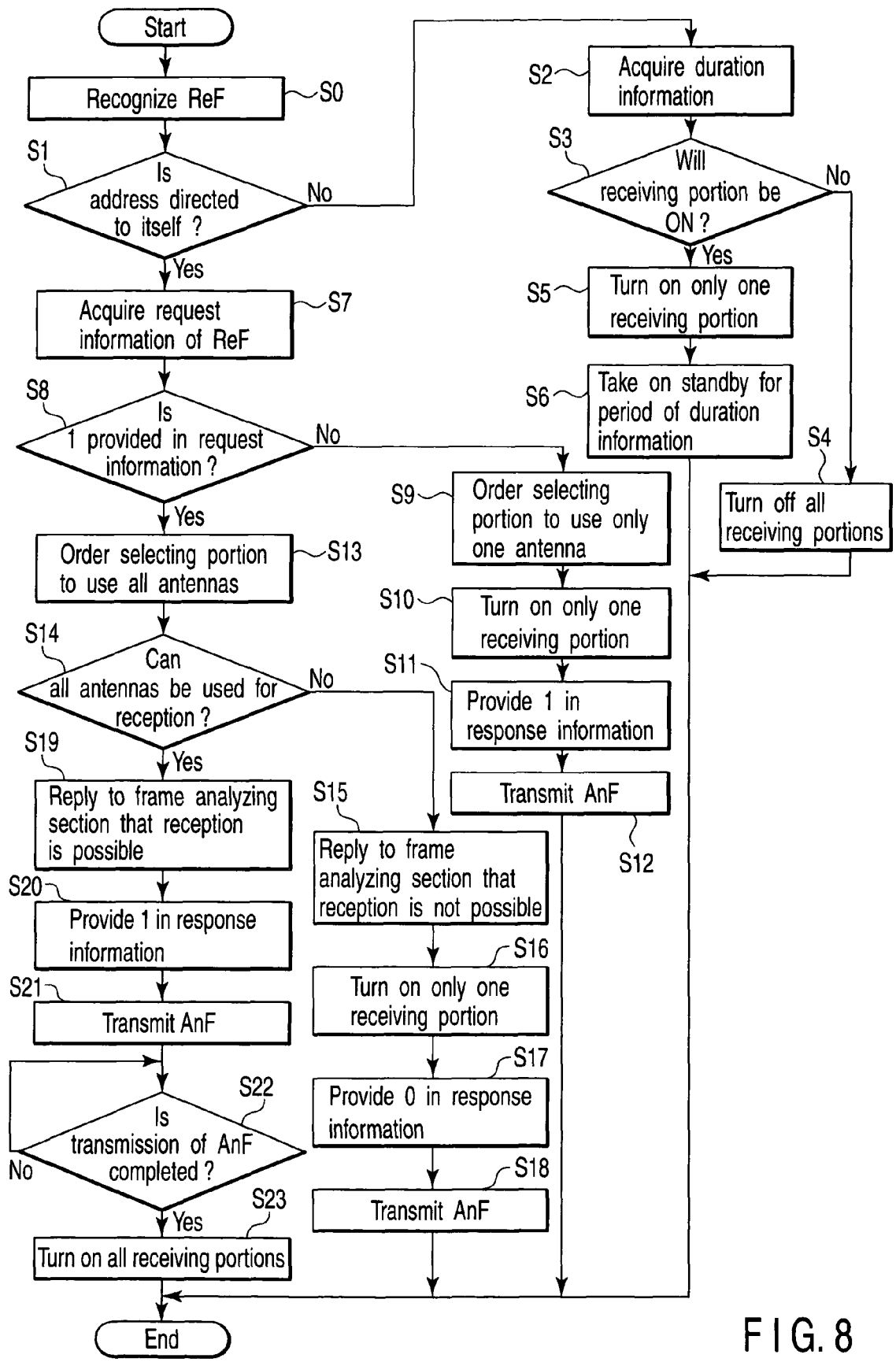
FIG. 8 is a flow chart showing a process sequence according to the first embodiment until a wireless terminal selects receiving portions.
Figure 9:
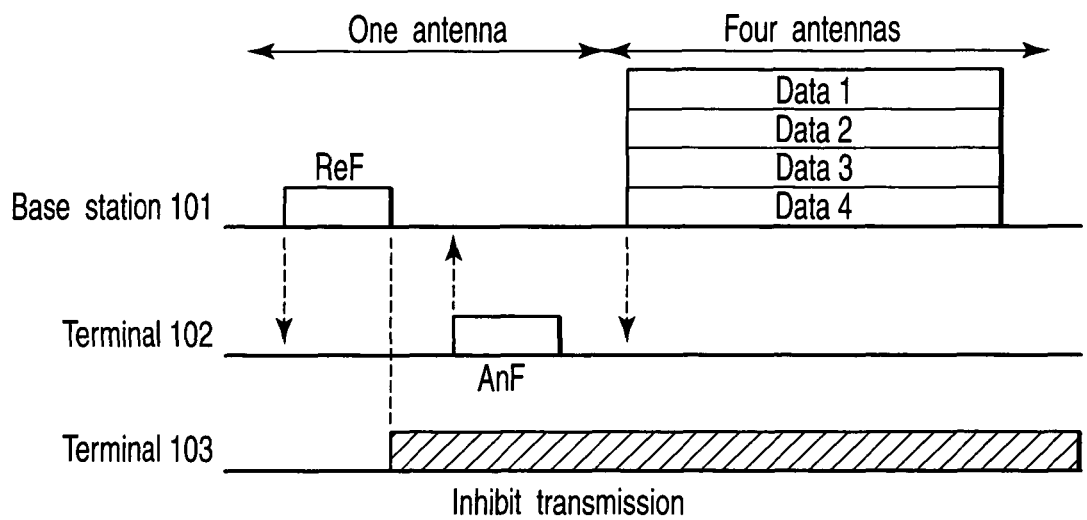
FIG. 9 is a frame interchange sequence view showing frame interchange performed between a wireless base station and wireless terminals in accordance with the process sequence according to the first embodiment.

FIG. 8 is a flow chart showing a process sequence according to the first embodiment until the wireless terminal 102 selects receiving portions 430S to 433S. FIG. 9 is a frame interchange sequence view showing frame interchange performed between the wireless base station 101 and wireless terminals 102 and 103 in accordance with the process sequence. An explanation will be given of the process sequence until the wireless terminal selects the receiving portions, with reference to FIGS. 8 and 9.

As shown in FIG. 9, the wireless base station 101 transmits an ReF 710 to the wireless terminal 102. When the wireless terminal 102 having the apparatus configuration shown in FIG. 4 receives the ReF 710 through the antenna 400S, the corresponding receiving portion 430S demodulates the ReF, and outputs it to the base-band processing section 440S. The base-band processing section 440S subjects this output to predetermined signal processing arranged in compliance with, e.g., IEEE 802.11 (802.11a, 802.11b, or the like) to convert it into a digital data MAC frame. Then, this MAC frame is transferred to the frame analyzing section 450S, and the transferred reception frame is analyzed.

Specifically, a frame information analyzing portion 451S analyzes the type and sub-type fields included in the frame control field of the MAC frame. Consequently, the MAC frame is recognized as an ReF 710 (see FIG. 7A), (step S0 in FIG. 8). Then, a frame address discriminating portion 452S analyzes information of the first address field 713 included in the ReF 710. Consequently, the terminal can discriminate whether this frame is directed to itself or not (step S1).

If the reception frame has a MAC address directed to itself, the terminal determines that this frame is directed to itself, as a matter of course. In addition, as in a multi-cast address and broad-cast address, where an address is directed to a plurality of wireless communication apparatuses, in which the terminal is included, the terminal determines that this frame is directed to itself.

If the answer of the step S1 is "No" (the frame is not directed to itself), the terminal acquires the value provided in the duration field 712 of the ReF 710 (step S2). Then, the terminal takes on standby for a time period provided in the duration field 712, while only one of the receiving portions 430S to 433S is set in the ON-state, or all the transmitting portions 420S to 423S and receiving portions 430S to 433S are set in the OFF-state (by the power supplies), (step S3 to S6).

On the other hand, if the answer of the step S1 is "Yes" (the frame is directed to itself), the terminal acquires the information provided in the request field 715 of the ReF 710 (step S7). Then, it is discriminated whether the information of the request field 715 acquired by the frame analyzing section 450S is "1" or not (step S8).

If the answer of the step S8 is "No" (the information of the request field 715 is "0"), the frame analyzing section 450S orders the selecting section 460S to select one of the receiving portions 430S to 433S. The selecting section 460S causes only one of the receiving portions 430S to 433S, which was in service immediately prior to this, to be held in the ON-state. The frame analyzing section 450S provides the response field 725 of an AnF 720 with "1" as its information. Then, the AnF 720 is transmitted, and the terminal takes on standby for reception while one receiving portion selected by the selecting section 460S is set in the ON-state (step S9 to S12).

On the other hand, if the answer of the step S8 is "Yes" (the information of the request field 715 is "1"), the frame analyzing section 450S orders the selecting section 460S to cause all the receiving portions 430S to 433S to be set in the ON-state (step S13). Then, the selecting section 460S discriminates whether all the receiving portions 430S to 433S can perform reception or not (step S14).

If the answer of the step S14 is "No" (not all the receiving portions 430S to 433S can perform reception), the selecting section 460S informs the frame analyzing section 450S that this reception is not possible. Further, the selecting section 460S causes only one of the receiving portions, which was in service immediately prior to this, to be held in the ON-state in the wireless terminal 102. The frame analyzing section 450S thus informed provides the response field 725 of an AnF 720 with "0" as its information. Then, the AnF 720 is transmitted, and the terminal takes on standby for reception while one receiving portion selected by the selecting section 460S is set in the ON-state (step S15 to S18).

On the other hand, if the answer of the step S14 is "Yes" (all the receiving portions 430S to 433S can perform reception), the selecting section 460S informs the frame analyzing section 450S that all the receiving portions 430S to 433S can perform reception. Further, the selecting section 460S causes all the receiving portions 430S to 433S to be set in the ON-state. The frame analyzing section 450S thus informed provides the response field 725 of an AnF 720 with "1" as its information. Then, the AnF 720 is transmitted (step S19 to S21), and the terminal takes on standby until the AnF 720 transmission is completed (step S22).

If the answer of the step S22 is "Yes" (the transmission is completed), the base-band processing section 440S informs the selecting section 460S that the AnF 720 transmission is completed. Then, the selecting section 460S causes all the receiving portions 430S to 433S to be set in the ON-state (step S23).

FIG. 9 shows a frame sequence where all the answers are "Yes" at the steps S1, S8, and S14. Specifically, the wireless base station 101 transmits an ReF 710, in which the request field 715 is provided with "1" as its information. The wireless terminal 102 receives it, and then transmits an AnF 720, in which the response field 725 is provided with "1" as its information, to the wireless base station 101. Further, the wireless terminal 102 causes the four receiving portions 430S to 433S to be set in the ON-state, and takes on standby for reception. The wireless base station 101 receives the AnF 720, and transmits different units of data 1 to 4, using the four transmitting portions 420A to 423A. Since the wireless terminal 102 is on standby while the four receiving portions 430S to 433S are set in the ON-state, it can receive the different units of data 1 to 4. On the other hand, the wireless terminal 103, to which the ReF 710 is not directed, inhibits transmission for a time period provided in the duration field 712.

After the time period elapses, the selecting section 460S of the destination wireless terminal 102 selects and causes one of the four receiving portions 430S to 433S to be held in the ON-state, while causing the other receiving portions to be set in the OFF-state. Alternatively, even after the time period elapses, the selecting section 460S may select and cause all the (i.e., four in this case) receiving portions 430S to 433S to be held in the ON-state for a while.

As described above, when a frame is transmitted by the wireless base station 101, using a plurality of transmitting portions (selected from the transmitting portions 420A to 423A), the wireless terminal 102 can analyze information of the frame, and discriminate whether the frame is directed to itself. Further, the wireless terminal 102 can recognize whether the power supplies of a plurality of receiving portions (selected ones of the receiving portions 430S to 433S) should be turned on. Accordingly, there is no need to cause the wireless portions to be set in the ON-state for a time period in which frame reception is not required. Furthermore, even though the wireless terminal 103 having only one antenna coexists, it can be caused to inhibit transmission for a time period provided in the duration fields 712 and 722 of the ReF 710 and AnF 720. Accordingly, it is possible to prevent frame collision and to preferentially transmit and receive data during this time period. On the other hand, the wireless base station 101 has the wireless communication apparatus configuration described above, and thus can perform wireless communication with either of the wireless terminals 102 and 103.

According to the first embodiment, only when a destination wireless communication apparatus is requested to perform data transmission using a plurality of antennas, the apparatus needs to cause its receiving portions to be set in the ON-state. Otherwise, the apparatus takes on standby for reception, with one receiving portion set in service, and thereby reduces the power consumption. In a wireless communication system in which a wireless communication apparatus having only one antenna coexists, wireless communication apparatuses can receive a first request frame. Consequently, a non-destination wireless communication apparatus can take on standby for transmission on the basis of the duration field of the request frame. The destination wireless communication apparatus can exclusively use the system for a certain time period, and thus does not suffer any interference during data transmission.

Further, frame interchange is performed in advance using a request frame and a response frame, and each of wireless communication apparatuses can thereby discriminate whether a subsequent frame is directed to itself or not. If the request frame is not directed to itself, the non-destination wireless communication apparatus can recognize that a plurality of receiving portions do not need to be set in the ON-state, and takes on standby for a time period provided in the duration field. Accordingly, the apparatus can be prevented from causing the receiving portions to be set in the ON-state for a time period in which a frame that is not needed to be received is transmitted.

Second Embodiment

The second embodiment is arranged on the basis of the first embodiment, and thus will be explained focusing on the differences. According to the second embodiment, in order to determine the number of transmitting portions and receiving portions correspondingly selected, frame interchange is performed before a sender wireless base station transmits information to a destination wireless terminal.

Figure 10A:
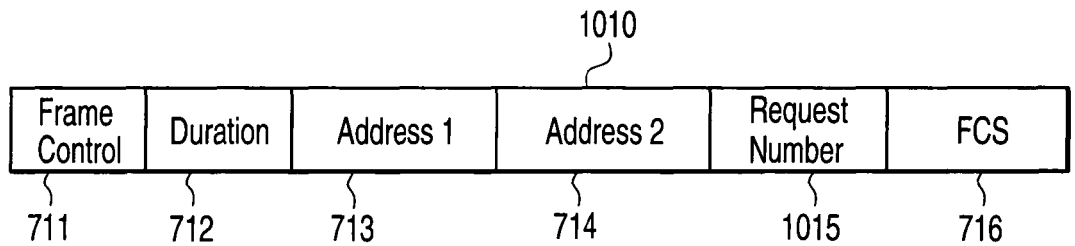
FIGS. 10A and 10B are views showing examples of a wireless-function service request frame and a wireless-function service response frame, respectively, according to a second embodiment.
Figure 10B:
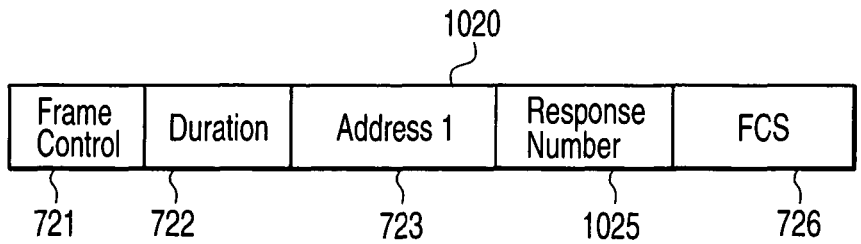

FIGS. 10A and 10B are views showing examples of a wireless-function service request frame (ReF) 1010 and a wireless-function service response frame (AnF) 1020, respectively, according to the second embodiment. The MAC frame 1010 shown in FIG. 10A includes a request number field (Request Number) 1015, in place of the request field 715 of the MAC frame 710 shown in FIG. 7A. The MAC frame 1020 shown in FIG. 10B includes a response number field (Response Number) 1025, in place of the response field 725 of the MAC frame 720 shown in FIG. 7B. The request number field 1015 is provided with the number of receiving portions of a destination wireless terminal which the sender wireless base station requests to be in service. The response number field 1025 is provided with the number of receiving portions actually determined be in service by a destination wireless terminal.

The second embodiment can be realized by the same wireless communication apparatus configuration as that shown in FIG. 4 according to the first embodiment. However, when the frame analyzing section 450 analyzes an ReF 1010, it extracts as information the request number of receiving portions provided in the request number field 1015. This request number is given to the selecting section 460 on the reception side, and the selecting section 460 determines the number of receiving portions to be actually in service, from the given number.

The selecting section 460 on the reception side outputs selection control signals for turning on the power supplies of the determined number of receiving portions, so that the destination wireless terminal causes the receiving portions to be set in the ON-state. Further, the selecting section 460 gives information concerning the determined number of receiving portions to the frame analyzing section 450 on the reception side. When an AnF 1020 is transmitted, the frame analyzing section 450 provides the response number field 1025 with this number information.

For example, it is assumed that the wireless base station 101 and wireless terminal 102 each having the wireless communication apparatus configuration shown in FIG. 4 communicate with each other (see FIG. 1). In this case, in accordance with the amount of data to be transmitted using a plurality of transmitting and receiving portions, the sender wireless base station 101 determines a request number of receiving portions, such as three, and provides the request number field 1015 of an ReF 1010 with "3."

When the destination wireless terminal 102 receives the ReF 1010, it extracts the information shown in the request number field 1015, and determines that three receiving portions (for example, portions 430S to 432S) will be set in service. Then, an AnF 1020 is provided with information "3," i.e., the determined number of receiving portions 430S to 432S, and is transmitted to the sender wireless base station 101. Thereafter, the destination wireless terminal 102 causes the three receiving portions 430S to 432S to be set in the ON-state by the time when a frame transmitted from the sender wireless base station 101 can be received. On the other hand, the wireless terminal 103, to which the ReF 1010 is not directed, inhibits transmission for a time period provided in the duration field 712.

After the time period elapses, the selecting section 460S of the destination wireless terminal 102 selects and causes one of the selected three receiving portions 430S to 432S to be held in the ON-state, while causing the other receiving portions to be set in the OFF-state. Alternatively, even after the time period elapses, the selecting section 460S may select and cause the selected three receiving portions 430S to 432S to be held in the ON-state for a while.

According to the second embodiment, only when a destination wireless communication apparatus is requested to perform data transmission using a plurality of antennas, the apparatus needs to cause its receiving portions to be set in the ON-state. Otherwise, the apparatus takes on standby for reception, with one receiving portion set in service, and thereby reduces the power consumption. Further, according to the second embodiment, a specific number of receiving portions needed to be in service can be requested, so that more precise control can be performed as compared to a case where all the receiving portions are simply turned on/off. Accordingly, the destination wireless communication apparatus can conform to the number of receiving portions requested by the sender wireless communication apparatus, so that it causes only wireless portions (receiving portions and/or transmitting portions) necessary for frame interchange to be set in the ON-state, and thereby reduces the power consumption.

Third Embodiment

The third embodiment is arranged on the basis of the first and second embodiments, and thus will be explained focusing on the differences. According to the first and second embodiments, information interchange is performed between the sender wireless base station and destination wireless terminal, before communication is performed using a plurality of transmitting portions and receiving portions. On the other hand, according to the third embodiment, when a sender wireless communication apparatus performs communication using a plurality of transmitting portions, the sender wireless communication apparatus transmits a wireless-function service declaration frame (DeF) to a destination wireless communication apparatus, wherein the DeF includes information concerning a request number of receiving portions.

For example, the DeF is provided with service request information in the same frame format as the ReF 710 or 1010 described above. However, no response frame (corresponding to the wireless-function service response frame) exists in reply to the DeF. Accordingly, the destination wireless terminal 102 does not need to transmit a response frame in reply to the DeF, but needs to follow the service request information provided in the DeF.

Figure 11:
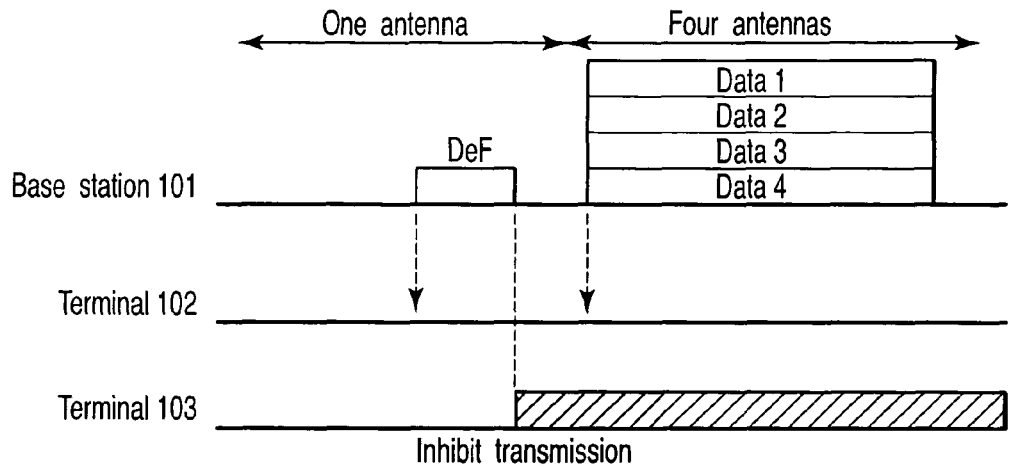
FIG. 11 is a frame interchange sequence view showing frame interchange performed between a wireless base station and wireless terminals in accordance with a process sequence according to a third embodiment, within the BSS configuration shown in FIG. 1.

FIG. 11 is a frame interchange sequence view showing frame interchange performed between the wireless base station 101 and wireless terminals 102 and 103 in accordance with a process sequence according to the third embodiment, within the BSS configuration shown in FIG. 1. For example, the wireless base station 101 transmits a DeF provided with the number of receiving portions to be in service in the destination wireless terminal 102 (for example, the DeF is similar to an ReF 1010 in which the request number field 1015 is provided with "4"). When the wireless terminal 102 receives the DeF, it causes the four receiving portions 430S to 433S to be set in the ON-state, and takes on standby for reception. On the other hand, the non-destination wireless terminal 103 inhibits transmission for a time period provided in the duration field (for example, the field 712 of the frame 1010). Then, the wireless base station 101 transmits different units of data 1 to 4, using the four transmitting portions 420A to 423A.

According to the third embodiment, only when a destination wireless communication apparatus is requested to perform data transmission using a plurality of antennas, the apparatus needs to cause its receiving portions to be set in the ON-state. Otherwise, the apparatus takes on standby for reception, with one receiving portion set in service, and thereby reduces the power consumption. Further, according to the third embodiment, the destination wireless communication apparatus needs not to transmit a response frame in reply to the wireless-function service declaration frame transmitted by the sender wireless communication apparatus. Accordingly, the third embodiment excludes the time necessary for transmitting the wireless-function service response frame in the first and second embodiments, thereby improving the throughput.

Fourth Embodiment

The fourth embodiment is arranged on the basis of the first embodiment, and thus will be explained focusing on the differences. According to the fourth embodiment, the wireless base station 101 transmits a special frame and the wireless terminal 102 receives it, so that the wireless terminal 102 is given a time period during which information is transmitted using a plurality of transmitting portions. In this communication, the wireless base station 101 and wireless terminal 102 select the number of transmitting portions and receiving portions, in accordance with the type of transmission frame.

Figure 12:
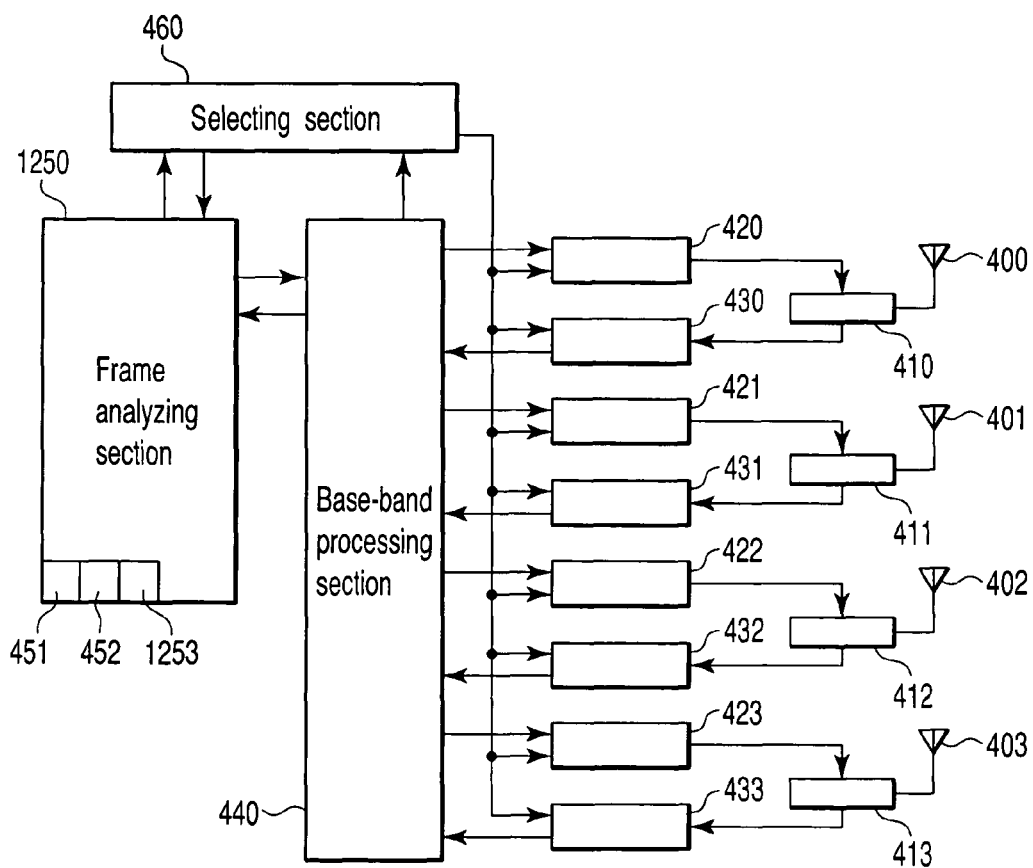
FIG. 12 is a view showing an example of the configuration of a wireless communication apparatus according to a fourth embodiment of the present invention.
Figure 13:
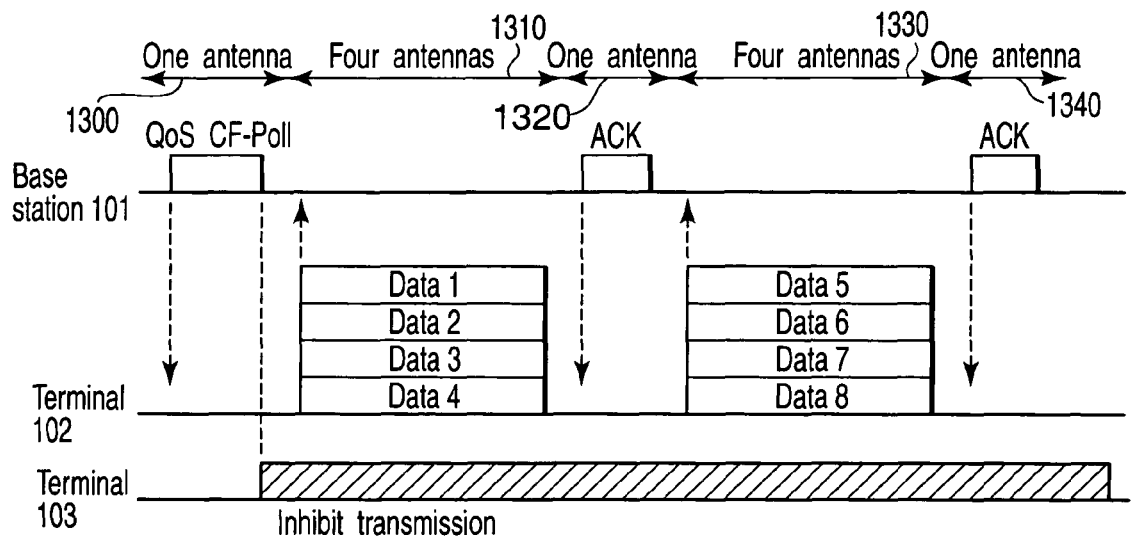
FIG. 13 is a frame interchange sequence view showing frame interchange performed between a wireless base station and wireless terminals in accordance with a process sequence according to the fourth embodiment, within the BSS configuration shown in FIG. 1.

FIG. 12 is a view showing an example of the configuration of a wireless communication apparatus according to the fourth embodiment of the present invention. The wireless communication apparatus shown in FIG. 12 is similar to the wireless communication apparatus shown in FIG. 4, but differs in that a frame analyzing section 1250 has, in addition to the frame information analyzing portion 451 and frame address discriminating portion 452, a frame type specifying portion 1253 configured to specify the type of frame. The frame type specifying portion 1253 on the transmission side recognizes the type of transmission frame, and gives this information about the type of transmission frame to the selecting section 460 on the transmission side. The selecting section 460 thus informed determines the number of transmitting portions to be set in the ON-state in accordance with the type of frame. Then, the selecting section 460 outputs a selection control signal indicative of this determined content, to cause transmitting portions necessary for transmission to be set in the ON-state FIG. 13 is a frame interchange sequence view showing frame interchange performed between the wireless base station 101 and wireless terminals 102 and 103 in accordance with a process sequence according to the fourth embodiment, within the BSS configuration shown in FIG. 1. The task group proceeding with standardizing work for IEEE 802.11e is conducting study to add a QoS (Quality of Service) function to a wireless LAN system arranged in compliance with IEEE 802.11. According to IEEE 802.11e, as shown in FIG. 13, when the wireless base station 101 transmits a transmission request inquiry frame (QoS CF-Poll), which is one of the IEEE 802.11e MAC frames, the wireless terminal 102 receiving this frame is given time periods to preferentially perform transmission. On the other hand, a wireless terminal (the wireless terminal 103 in FIG. 13), to which the inquiry frame is not directed, other than the wireless terminal 102, has to take on standby for transmission for a time period provided in the duration field of the inquiry frame.

When the wireless base station 101 transmits a transmission request inquiry frame (QoS CF-Poll), this frame needs to reach all the wireless terminals to achieve a transmission inhibition time period. Accordingly, the wireless base station 101 preferably uses only one transmitting portion for this transmission. In order to realize this operation, the frame type specifying portion 1253A of the frame analyzing section 1250A in the wireless base station 101 recognizes that a transmission request inquiry frame is to be transmitted. When the frame analyzing section 1250A transfers the transmission request inquiry frame, the frame is provided with wireless-function request information indicating that the destination wireless terminal 102 can perform transmission using the four transmitting portions 420S to 423S. QoS CF-Poll standardized by present IEEE 802.11e has one bit as a spare bit, which may be used for the wireless-function request information. If necessary, a new field for the wireless-function request information may be added to QoS CF-Poll.

The selecting section 460A is informed of the fact that the frame to be transmitted by the wireless base station 101 is a transmission request inquiry frame, and is also informed of the content of the wireless-function request information provided in the frame. The selecting section 460A determines that the transmitting portion 420A will be in service to transmit the transmission request inquiry frame. Further, the selecting section 460A determines that receiving portions 430A to 433A will be in service in the wireless base station 101 to receive a frame transmitted by the destination wireless terminal 102 using the four transmitting portions 420S to 423S. Then, the selecting section 460A outputs a selection control signal to the transmitting portion 420A and causes the transmitting portion 420A to be set in the ON-state, so that the wireless base station 101 transmits the transmission request inquiry frame to the wireless terminal 102. After this transmission, the selecting section 460A of the wireless base station 101 causes the receiving portions 430A to 433A to be set in the ON-state (a time period 1300 in FIG. 13).

When the destination wireless terminal 102 receives the transmission request inquiry frame (QoS CF-Poll), the frame information analyzing portion 451S of the wireless terminal 102 extracts the wireless-function request information provided in the transmission request inquiry frame. Thus, the frame information analyzing portion 451S recognizes that there is a request to transmit a frame, using four transmitting portions, and gives this information to the selecting section 460S. The selecting section 460S requests the base-band processing section 440S to cause the four transmitting portions 420S to 423S to be set in the ON-state. The four transmitting portions 420S to 423S are thereby set in the ON-state. Consequently, the wireless terminal 102 is allowed to transmit a data frame (Data), (a time period 1310).

When the wireless base station 101 receives the data frame from the wireless terminal 102, it transmits a confirm frame (ACK) to the wireless terminal 102 to inform that the data has bee accurately received. In order for this, the frame type specifying portion 1253A of the frame analyzing section 1250A in the wireless base station 101 recognizes that the confirm frame will be transmitted, and gives this information to the selecting section 460A. The selecting section 460A determines that the transmitting portion 420A will be in service to transmit the confirm frame.

When the wireless base station 101 receives a frame in the time period 1310, if the frame information analyzing portion 451A recognizes that the frame is a non-final frame, and the destination wireless terminal 102 will further perform transmission using the four transmitting portions 420S to 423S, the selecting section 460A of the wireless base station 101 determines that the receiving portions 430A to 433A will be in service to receive the frame. Then, the selecting section 460A outputs a selection control signal to the transmitting portion 420A to cause the transmitting portion 420A to be set in the ON-state, and transmits a confirm frame. After this transmission, the selecting section 460A causes the receiving portions 430A to 433A to be set in the ON-state (a time period 1320).

During time periods 1330 and 1340, a data frame and a corresponding confirm frame are also transmitted in the same manner as described above, thereby performing frame interchange. Thereafter, when the wireless base station 101 recognizes arrival of the final frame, it causes the receiving portions 430A to 433A to be set in the OFF-state. Further, when the wireless terminal 102 receives a confirm frame in reply to the final frame, it causes the receiving portions 430S to 433S to be set in the OFF-state. In this case, each of the wireless base station 101 and wireless terminal 102 takes on standby for reception while, in general, one receiving portion is set in the ON-state. However, if each of them knows the time to perform the next reception, i.e., to turn on the power supplies, the power supplies of all the receiving portions may be set in the OFF-state.

According to the fourth embodiment, a wireless communication apparatus performs power supply control of the transmitting portions and receiving portions in accordance with the type of transmission frame, and thereby reduces the power consumption. When a frame with a large amount of data is transmitted, the apparatus performs frame interchange using a plurality of transmitting portions and receiving portions, and thereby realizes frame transfer with high throughput.

Fifth Embodiment

The fifth embodiment is a combination of the fourth embodiment with the second and third embodiments.

According to the fourth embodiment, the transmission request inquiry frame (QoS CF-Poll) has only one bit of information as to whether a plurality of transmitting portions will be used or not in a wireless terminal. On the other hand, according to the fifth embodiment, in order to more finely control the number of transmitting portions to be turned on/off by their power supplies, the number of transmitting portions is designated. In this example, after a wireless terminal receives a transmission request inquiry frame (QoS CF-Poll) according to the fourth embodiment, the wireless terminal determines the number of transmitting portions, utilizing a wireless communication function service request frame and a wireless communication function service response frame according to the second embodiment, or utilizing a wireless communication function service declaration frame according to the third embodiment.

Figure 14:
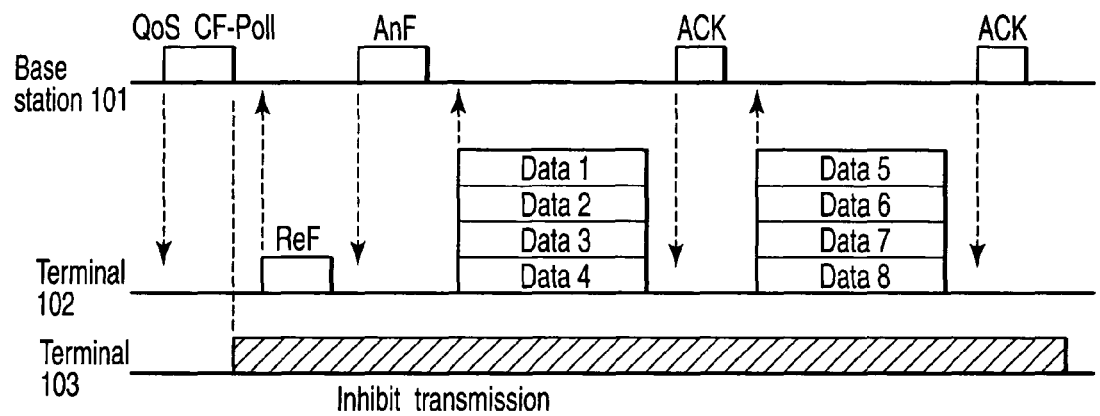
FIGS. 14A and 14B are frame interchange sequence views showing different examples of frame interchange performed between a wireless base station and wireless terminals in accordance with a process sequence according to a fifth embodiment, within the BSS configuration shown in FIG. 1.
Figure 14:
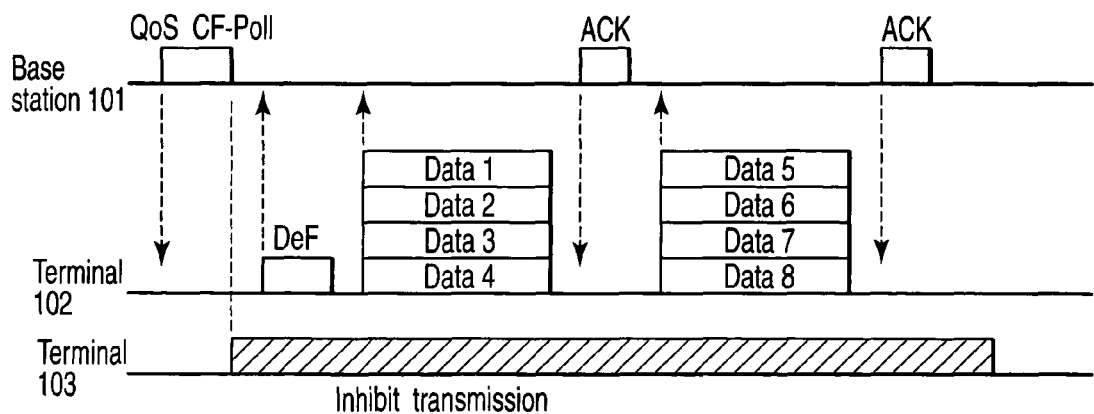

FIG. 14A is a frame interchange sequence view showing frame interchange performed between the wireless base station 101 and wireless terminals 102 and 103 in accordance with a process sequence according to the fifth embodiment, within the BSS configuration shown in FIG. 1. In this example, a wireless communication function service request frame (ReF) and a wireless communication function service response frame (AnF) are utilized. As shown in FIG. 14A, the wireless base station 101 transmits a transmission request inquiry frame (QoS CF-Poll), and the wireless terminal 102 receives it. The wireless terminal 102 determines that a plurality of transmitting portions (selected from the transmitting portions 420S to 423S) will be in service in accordance with a demand. For example, if the wireless terminal 102 determines that four transmitting portions will be in service for the amount of data to be transmitted, the wireless terminal 102 needs to request the wireless base station 101 to cause four receiving portions to be set in service. Accordingly, "4" is provided in the request number field 1015 of an ReF 1010, as shown in FIG. 10(a).

When the wireless base station 101 receives the ReF 1010, it extracts the information shown in the request number field 1015, and determines that the four receiving portions 430A to 433A will be in service. Then, the wireless base station 101 provides information "4" in an AnF 1020 as a determined number of receiving portions, and then transmits the AnF 1020 to the wireless terminal 102. After the wireless base station 101 transmits the AnF, it causes the four receiving portions 430A to 433A to be set in the ON-state by the time when a frame transmitted from the wireless terminal 102 can be received. On the other hand, the other wireless terminal 103 inhibits transmission for a time period provided in the duration field 712 of the ReF 1010.

FIG. 14B is a frame interchange sequence view showing frame interchange performed between the wireless base station 101 and wireless terminals 102 and 103 in accordance with another process sequence according to the fifth embodiment, within the BSS configuration shown in FIG. 1. In this example, a wireless-function service declaration frame (DeF) is utilized. As shown in FIG. 14B, the wireless base station 101 transmits a transmission request inquiry frame (QoS CF-Poll), and the wireless terminal 102 receives it. Thereafter, for example, in accordance with the amount of data to be transmitted using a plurality of transmitting portions, the wireless terminal 102 determines a request number of receiving portions, such as four, and transmits a DeF provided with this number (for example, the DeF is similar to an ReF 1010 in which the request number field 1015 is provided with "4").

When the wireless base station 101 receives the DeF, it causes the four receiving portions 430A to 433A to be set in the ON-state by the time when a frame transmitted from the wireless terminal 102 can be received. On the other hand, the other wireless terminal 103 inhibits transmission for a time period provided in the duration field (for example, the field 712 of the ReF 1010).

According to the fifth embodiment, after a wireless communication apparatus receives a transmission request inquiry frame (QoS CF-Poll), it performs frame transmission to negotiate the number of transmitting portions and receiving portions to be in service. Consequently, the apparatus can perform fine power supply control of the transmitting portions and receiving portions, and thereby realize lower power consumption and higher throughput.

Sixth Embodiment

The sixth embodiment is arranged on the basis of the first to fourth embodiments, and thus will be explained focusing on the differences. According to the sixth embodiment, when a wireless communication apparatus transmits information using a plurality of transmitting portions, it selects and determines the number of transmitting portions in accordance with wireless communication situations.

Figure 15:
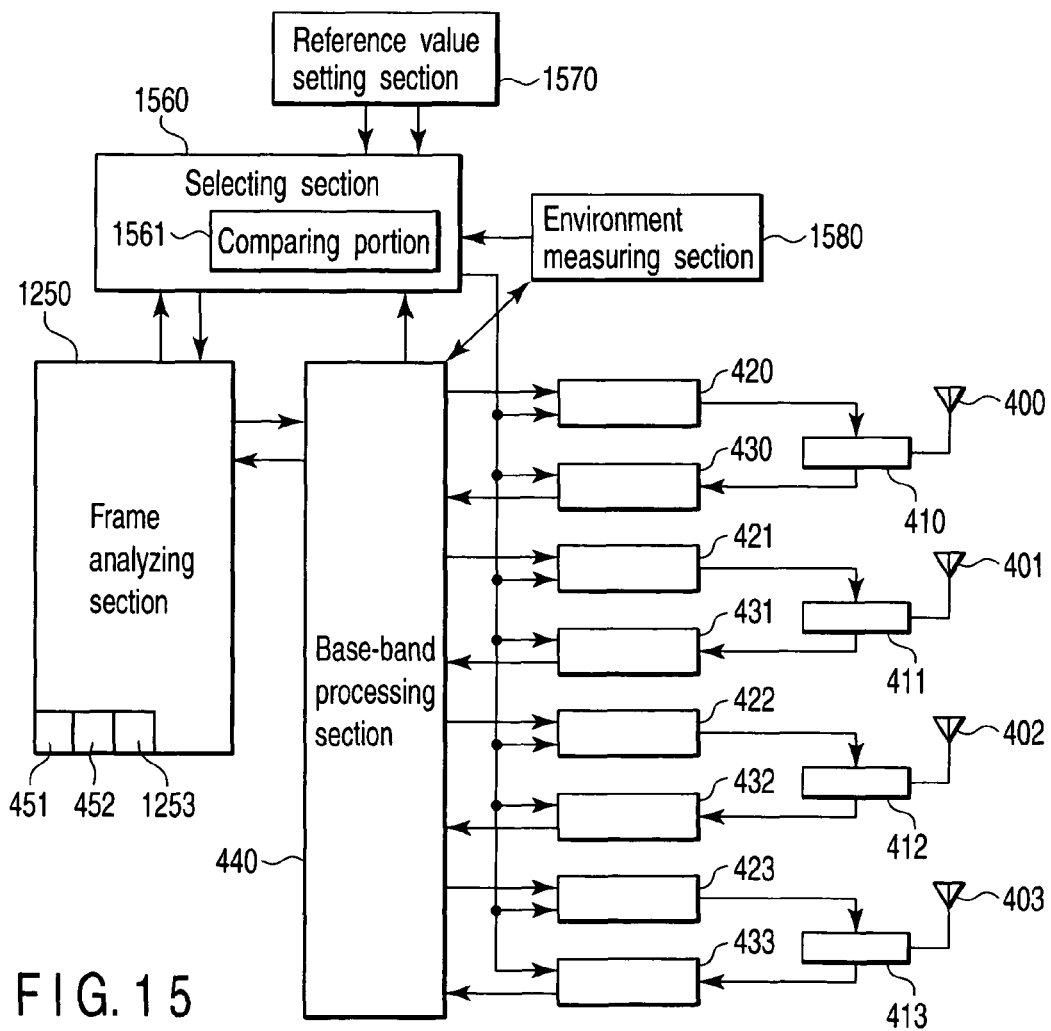
FIG. 15 is a view showing an example of the configuration of a wireless communication apparatus according to a sixth embodiment of the present invention.

FIG. 15 is a view showing an example of the configuration of a wireless communication apparatus according to the sixth embodiment of the present invention. The wireless communication apparatus shown in FIG. 15 is similar to the wireless communication apparatus shown in FIG. 12, but differs in that a selecting section 1560 configured to select transmitting portions and receiving portions further has a comparing portion 1561, and the selecting section 1560 is connected to a reference value setting section 1570 configured to set a reference value of a wireless communication environment, and is also connected to an environment measuring section 1580 configured to measure a wireless communication environment.

The reference value setting section 1570 sets a first threshold value for selecting transmitting portions and a second threshold value for selecting the number of streams to be transmitted. The environment measuring section 1580 outputs a first observation value indicative of the transmission path condition to the selecting section 1560. The frame analyzing section 1250 outputs a second observation value indicative of the type of information to be transmitted, to the selecting section 1560. The comparing portion 1561 of the selecting section 1560 compares the first and second threshold values with the first and second observation values, respectively. The comparing portion 1561 obtains first and second comparison results. The first comparison result is a result of discrimination as to whether the first observation value is equal to, more than, or not more than the first threshold value. The second comparison result is a result of discrimination as to whether the second observation value is equal to, more than, or not more than the second threshold value.

Figure 16:
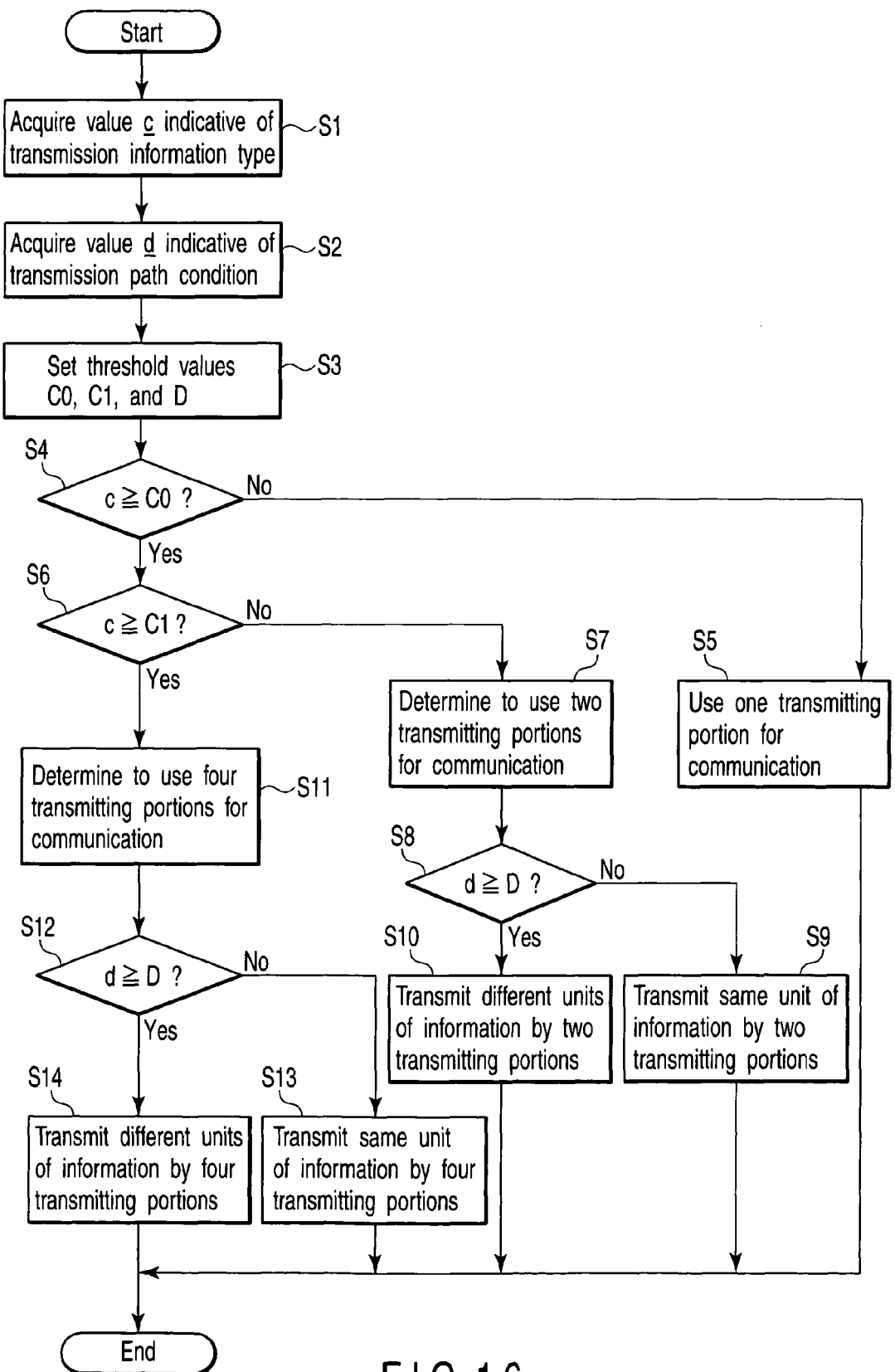
FIG. 16 is a flow chart showing a process sequence according to the sixth embodiment until the number of transmitting portions to be in service is determined when the wireless base station transmits information to a wireless terminal (for example, as in the first or second embodiment)

According to the sixth embodiment, the selecting section 1560 shown in FIG. 15 selects the number of transmitting portions in accordance with the type of information to be transmitted, and determines whether different units of information or the same unit of information should be transmitted from the selected transmitting portions. FIG. 16 is a flow chart showing a process sequence according to the sixth embodiment until the number of transmitting portions to be in service is determined when the wireless base station transmits information to a wireless terminal (for example, as in the first or second embodiment).

At first, the selecting section 1560 acquires a type value (the second observation value) c indicative of the type of transmission information (including the type of frame) from the frame analyzing section 1250. Further, the selecting section 1560 acquires a situation value (the first observation value) d indicative of the transmission path condition from the environment measuring section 1580 (steps S1 and S2). The first observation value d includes at least one of a signal to noise ratio (S/N), an error vector magnitude (EVM), a reception signal strength indication (RSSI), a bit error rate (BER), and a packet error rate (PER).

On the other hand, the reference value setting section 1570 sets second threshold values C0 and C1 (wherein C0<C1) for determining a selection number of transmitting portions, and a first threshold value D for determining the number of streams to be transmitted from a plurality of transmitting portions (step S3). The second threshold values C0 and C1 are determined in accordance with the type of information, such as audio, video, control information, and the amount of data. The first threshold value D is a parameter corresponding to the first observation value d.

Then, it is discriminated whether the type value c indicative of the type of transmission information is equal to, more than, or not more than the threshold value C0 (step S4). If the answer of the step S4 is "No" (the type value c is less than the threshold value C0), it is determined to use one transmitting portion for wireless communication (step S5).

If the answer of the step S4 is "Yes" (the type value c is equal to or more than the threshold value C0), it is further discriminated whether the type value c is equal to, more than, or not more than the threshold value C1 (step S6). If the answer of the step S6 is "No" (the type value c is less than the threshold value C1), it is determined to use two transmitting portions for wireless communication (step S7). Then, it is discriminated whether the observation value d indicative of the transmission path condition is equal to, more than, or not more than the threshold value D (step S8).

If the answer of the step S8 is "No" (the observation value d is less than the threshold value D), it is deemed that the wireless environment is bad, and the same unit of information is transmitted from the two transmitting portions (step S9). If the answer of the step S8 is "Yes" (the observation value d is equal to or more than the threshold value D), it is deemed that the wireless environment is good, and different units of information are transmitted from the two transmitting portions (step S10).

On the other hand, if the answer of the step S6 is "Yes" (the type value c is equal to or more than threshold value C1), it is determined to use four transmitting portions for wireless communication (step S11). Then, in order to perform stream selection, it is discriminated whether the observation value d indicative of the transmission path condition is equal to, more than, or not more than the threshold value D (step S12).

If the answer of the step S12 is "No" (the observation value d is less than the threshold value D), it is determined to transmit the same unit of information from the four transmitting portions (step S13). If the answer of the step S12 is "Yes" (the observation value d is equal to or more than threshold value D), it is determined to transmit different units of information from the four transmitting portions (step S14).

According to the sixth embodiment, a wireless communication apparatus selects transmitting portions on the basis of the type of information to be transmitted, and thereby reduces the power consumption. Further, the apparatus determines whether to transmit the same unit of information or different units of information, from selected transmitting portions on the basis of the measurement result of the transmission path condition. Consequently, the apparatus can select the manner for transmitting information in accordance with the wireless communication environment, and thereby realize higher quality wireless communication.

Seventh Embodiment

The seventh embodiment is arranged on the basis of the second embodiment, and thus will be explained focusing on the differences. According to the seventh embodiment, when a destination wireless terminal receives a wireless-function service request frame from a sender wireless base station and selects receiving portions in number designated in the frame, the terminal always selects, as one of them, a receiving portion having been in service for receiving the wireless-function service request frame.

For example, in the wireless communication system shown in FIG. 1, the wireless terminal 102 having the wireless communication apparatus configuration shown in FIG. 4, 12, or 15 receives, by its receiving portion 430S, a wireless-function service request frame from the wireless base station 101. In this case, if the number of receiving portions requested to the wireless terminal 102 is three, the selecting section 460S (or selecting section 1560S) of the wireless terminal 102 selects the receiving portions 431S and 432S in addition to the receiving portion 430S.

According to the seventh embodiment, a wireless communication apparatus selects receiving portions in number designated by a sender wireless communication apparatus, and thereby reduces the power consumption. Further, since a receiving portion, which was in service for reception immediately prior to this, is used, it can perform reception without renewing parameters necessary for wireless communication. This can simplify the process sequence up to information reception.

Eighth Embodiment

The eighth embodiment is arranged on the basis of the second and sixth embodiments, and thus will be explained focusing on the differences. According to the eighth embodiment, when receiving portions are selected, all the receiving portions are once set in the ON-state, and then only a predetermined number of receiving portions are held in the ON-state in order of higher reception quality, while a receiving portion with a lower reception quality is set in the OFF-state, in accordance with wireless communication environment observation values.

For example, in the BSS configuration shown in FIG. 1, the wireless terminal 102 (destination) having the wireless communication apparatus configuration shown in FIG. 15 receives a wireless-function service request frame from the wireless base station 101 (sender). In this case, the frame analyzing section 1250S of the wireless terminal 102 recognizes that the selection number of receiving portions provided in the wireless-function service request frame is three, and gives this information to the selecting section 1560S.

Then, the selecting section 1560S first informs the base-band processing section 440S that all the four receiving portions 430S to 433S will be set in the ON-state, and causes the four receiving portions 430S to 433S to be set in the ON-state. Then, wireless communication information is received by the four receiving portions 430S to 433S, and transferred to the base-band processing section 440S, where the information is subjected to predetermined signal processing to output a reception frame. When the base-band processing section 440S performs the base-band processing, the environment measuring section 1580S measures the transmission path condition. The environment measuring section 1580S gives this measured environment information to the selecting section 1560S. The selecting section 1560S selects and causes only three receiving portions to be held in the ON-state (by the power supplies) in order of higher reception quality, while the other receiving portion is set in the OFF-state (by the power supply), in accordance with the given environment information.

According to the eighth embodiment, a wireless communication apparatus first measures the reception characteristics of receiving portions to confirm the level of reception quality of the receiving portions, and causes receiving portions to be set in the ON-state in the number necessary for reception. Consequently, the apparatus can reduce the power consumption and improve the reception quality.

Ninth Embodiment

The ninth embodiment is arranged on the basis of the first to eighth embodiments, and thus will be explained focusing on the differences. According to the ninth embodiment, time periods are set in advance to perform wireless communication. In one time period, a sender wireless communication apparatus uses one transmitting portion to transmit information to one receiving portion of a destination wireless communication apparatus. In another time period, the sender wireless communication apparatus uses a plurality of transmitting portions to transmit information to a plurality of receiving portions of the destination wireless communication apparatus.

Figure 17:
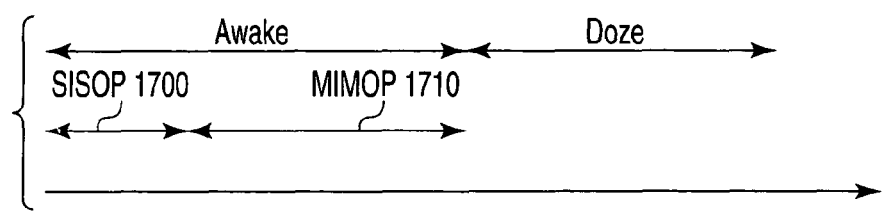
FIG. 17A is a view showing an example for setting service periods of a plurality of wireless portions according to a ninth embodiment.
FIG. 17B is a view showing a modification for setting service periods of a plurality of wireless portions.
Figure 17:
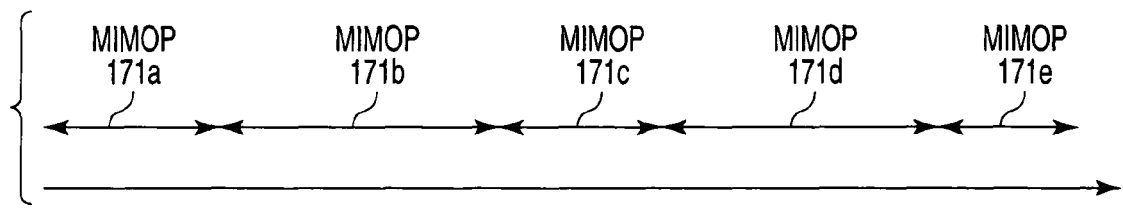

FIG. 17A is a view showing an example for setting service periods of a plurality of wireless portions according to the ninth embodiment. As shown in FIG. 17A, a wireless communication apparatus is provided with an awake (Awake) time period in which it can perform transmission and reception, and a doze (Doze) time period in which the power supply is set in the OFF-state and thus it cannot perform reception. Further, the awake time period includes a single wireless portion service period (SISOP: SISO Period) 1700 to perform wireless communication by one transmitting portion and one receiving portion, and a multiple wireless portion service period (MIMOP: MIMO Period) 1710 to perform wireless communication by a plurality of transmitting portions and receiving portions.

For example, in the BSS configuration shown in FIG. 1, when the MIMOP 1710 starts, the wireless base station 101 (sender) transmits a transmission request inquiry frame to the wireless terminal 102 (destination). The wireless terminal 102 receives this frame and is allowed to use a plurality of transmitting portions 420S to 423S for transmission in a time period provided in the frame. On the other hand, since the wireless base station 101 knows that the wireless terminal 102 will use a plurality of transmitting portions 420S to 423S in the MIMOP 1710 to transmit a frame, the wireless base station 101 can receive the frame when the wireless terminal 102 transmits it.

The MIMOP 1710 can be provided in advance by management information interchange between the wireless base station 101 and wireless terminal 102 when the wireless terminal 102 joins the BSS headed by the wireless base station 101. In this case, as shown in FIG. 17B, a plurality of MIMOPs 171a to 171e may be allocated to respective wireless terminals by time sharing. Each of the wireless terminals is set in an awake state only during the MIMOP allocated to itself. For example, if a time period MIMOP 171a is allocated to a wireless communication apparatus, the apparatus is prepared to communicate only in this time period, while its transmitting portions and receiving portions are set in the OFF-state in the other time periods.

In the explanation described above, the MIMOP is used as a time period in which a wireless signal is transmitted by a plurality of transmitting portions and received by a plurality of receiving portions. Alternatively, the MIMOP may be used as a time period in which a wireless signal is transmitted by one transmitting portion and received by one receiving portion, or a wireless signal is transmitted by a plurality of transmitting portions and received by one receiving portion. On the other hand, the SISOP is a time period in which wireless communication is performed between one transmitting portion and one receiving portion, i.e., in the same manner as conventional ordinary communication, and thus it will not be explained in detail here.

According to the ninth embodiment, a wireless communication apparatus performs power supply control of transmitting portions and receiving portions in accordance with an awake time period and/or a multiple wireless portion service period, and thereby reduce the power consumption.

Matters Common to First to Ninth Embodiments

The features of the first to ninth embodiments may be applied to a wireless communication apparatus solely for a receiving function configuration or solely for a transmitting function configuration. For example, looking only at the receiving function configuration of the wireless communication apparatus shown in FIG. 4, 12, or 15, the apparatus includes an M-number of (M is an integer of 2 or more) receiving portions connected to respective antennas. The selecting section 460 or 1560 selects a P-number of (P is an integer of from 0 to M) receiving portions from the M-number of receiving portions on the basis of an analysis result obtained by the frame analyzing section 450 or 1250.

On the other hand, looking only at the transmitting function configuration of the wireless communication apparatus shown in FIG. 4, 12, or 15, the apparatus includes an N-number of (N is an integer of 2 or more) transmitting portions connected to respective antennas. The selecting section 460 or 1560 selects a Q-number of (Q is an integer of from 0 to N) transmitting portions from the N-number of transmitting portions on the basis of an analysis result obtained by the frame analyzing section 450 or 1250.

Further, the features of the first to ninth embodiments may be applied to a typical wireless communication apparatus having both of a receiving function configuration and a transmitting function configuration. For example, looking at both of the receiving function configuration and transmitting function configuration of the wireless communication apparatus shown in FIG. 4, 12, or 15, the apparatus includes an X-number of (X is an integer of 1 or more) receiving portions connected to respective antennas, and a Y-number of (Y is an integer of 1 or more to satisfy X+Y being an integer of 3 or more) transmitting portions connected to respective antennas. The selecting section 460 or 1560 selects a P-number of (P is an integer of from 0 to X) receiving portions from the X-number of receiving portions, and selects a Q-number of (Q is an integer of from 0 to Y) transmitting portions from the Y-number of transmitting portions on the basis of an analysis result obtained by the frame analyzing section 450 or 1250.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication apparatus which communicates with a first wireless device and a second wireless device, and which is capable of receiving a first frame and a second frame, and transmitting a third frame, wherein the first wireless device is capable of transmitting the first frame and the second frame, and receiving the third frame, and the second wireless device is capable of receiving the first frame and the third frame and is incapable of receiving the second frame, the apparatus comprising:
an M-number of (M is an integer of 2 or more) receiving portions configured to receive the first frame and the second frame, the first frame being capable of being received by at least one of the receiving portions, the second frame being capable of being received by at least two of the receiving portions;
a frame analyzing section configured to analyze the first frame received by a J-number of (J is an integer from 1 to (M−1)) receiving portions to discriminate whether the first frame is directed to the wireless communication apparatus or not; and
a selecting section configured to select a receiving portion to be in service from the M-number of receiving portions, wherein,
the selecting section selects a P-number of (P is an integer from 1 to M) receiving portions from the M-number of receiving portions when the frame analyzing section discriminates the first frame as a frame directed to the wireless communication apparatus,
the selecting section controls a power supply of the receiving portions to reduce a power consumption of an unselected receiving portion, and to set a selected receiving portion to an operating state after the first frame is received portions and before the second frame is received, and
the selecting section controls the power supply to set one of the receiving portions in an operating state and to reduce a power consumption of the receiving portions other than the one of the receiving portions which is set in the operating state, after a period in which one of the first frame and the third frame inhibits the second wireless device from communicating elapses.

2. The apparatus according to claim 1, wherein the selecting section selects the P-number of receiving portions to include therein at least one receiving portion, which has been in service until immediately before selection.

3. The apparatus according to claim 1, further comprising:
an environment measuring section configured to detect a first observation value indicative of a transmission path condition, wherein,
when the selecting section selects the P-number of receiving portions, all the receiving portions are once set in an ON-state, and then the P-number of receiving portions are held in an ON-state in order of higher reception quality, while a receiving portion with a lower reception quality is set in an OFF-state, in accordance with the first observation value.

4. The apparatus according to claim 1, wherein the J is 1 or M−1.

5. The apparatus according to claim 1, further comprising:
transmitting portions configured to transmit the third frame to the first wireless device, wherein,
the transmitting portions transmit the third frame before the transmission of the second frame, when the analyzing section determines that the first frame is directed to the wireless communication apparatus, the third frame includes information on an operation condition of the receiving portions, and the selecting section controls the power supply of the receiving portions to set the selected receiving portions to an operating state according to the number of receiving portions reported in advance to the first wireless device.

6. The apparatus according to claim 1, wherein when the frame analyzing section discriminates the first frame as a frame directed not to the wireless communication apparatus, the selecting section unselects the M-number of receiving portions and controls the power supply of the unselected receiving portions after receiving the first frame to reduce the power consumption of the unselected receiving portions.

7. A wireless communication apparatus which includes a plurality of receiving portions and transmitting portions to transmit a plurality of data streams wirelessly to a first wireless device and a second wireless device, and which is capable of receiving a first frame and a second frame, and transmitting a third frame, wherein the first wireless device is capable of transmitting the first frame and the second frame, and receiving the third frame, and the second wireless device is capable of receiving the first frame and the third frame and is incapable of receiving the second frame, the apparatus comprising:

an X-number of (X is an integer of 2 or more) receiving portions connected to respective antennas and configured to receive the first frame and the second frame, the first frame being capable of being received by at least one of the receiving portions, the second frame being capable of being received by at least two of the receiving portions;

a Y-number of (Y is an integer of 1 or more to satisfy X+Y being an integer of 3 or more) transmitting portions connected to respective antennas;

a frame analyzing section configured to analyze a reception frame received by a J-number of (J is an integer from 1 to (X−1)) receiving portions and a transmission frame and to analyze the first frame received by the J-number of receiving portions to discriminate whether the first frame is directed to the wireless communication apparatus or not; and a selecting section configured to select a receiving portion to be in service from the X-number of receiving portions, and to select a transmitting portion to be in service from the Y-number of transmitting portions, wherein, the selecting section selects a P-number of (P is an integer from 1 to X) receiving portions from the X-number of receiving portions, and selects a Q-number of (Q is an integer from 0 to Y) transmitting portions from the Y-number of transmitting portions, based on an analysis result of the reception frame and the transmission frame obtained by the frame analyzing section, respectively, the selecting section selects the P-number of receiving portions from the X-number of receiving portions when the frame analyzing section discriminates the first frame as a frame directed to the wireless communication apparatus, the selecting section controls a power supply of the receiving portions to reduce a power consumption of unselected receiving portions, and to set a selected receiving portion to an operating state after the first frame is received and before the second frame is received, the selecting section controls a power supply of the transmitting portions to reduce a power consumption of unselected transmitting portions, and to set a selected transmitting portion to an operating state, and the selecting section controls the power supply to set one of the receiving portions in an operating state and to reduce a power consumption of the receiving portions other than the one of the receiving portions which is set in the operating state, after a period in which one of the first frame and the third frame inhibits the second wireless device from communicating elapses.

8. The apparatus according to claim 7, wherein the selecting section selects the P-number of receiving portions to include therein at least one receiving portion, which has been in service until immediately before selection.

9. The apparatus according to claim 7, further comprising:

an environment measuring section configured to detect a first observation value indicative of a transmission path condition, wherein, when the selecting section selects the P-number of receiving portions, all the receiving portions are once set in an ON-state, and then the P-number of receiving portions are held in an ON-state in order of higher reception quality, while a receiving portion with a lower reception quality is set in an OFF-state, in accordance with the first observation value.

10. A wireless communication system comprising:

a first wireless communication apparatus which is capable of transmitting a first frame and a second frame and receiving a third frame;

a second wireless communication apparatus which is capable of receiving the first frame and the third frame and is incapable of receiving the second frame; and a third wireless communication apparatus which is capable of receiving the first frame and the second frame, and transmitting a third frame, wherein the first wireless communication apparatus comprises:

an N-number of (N is an integer of 2 or more) transmitting portions connected to respective antennas;

a frame analyzing section configured to analyze a transmission frame; and a selecting section configured to select a Q-number of (Q is an integer from 0 to N) transmitting portions from the N-number of transmitting portions, based on an analysis result of the transmission frame obtained by the frame analyzing section; and the third wireless communication apparatus comprises:

an M-number of (M is an integer of 2 or more) receiving portions connected to respective antennas and configured to receive the first frame and the second frame, the first frame being capable of being received by at least one of the receiving portions, the second frame being capable of being received by at least two of the receiving portions;

a frame analyzing section configured to analyze a reception frame received by a J-number of (J is an integer from 1 to (M−1)) receiving portions and to configured to analyze the first frame received by the J-number of receiving portions to discriminate whether the first frame is directed to the third wireless communication apparatus or not; and a selecting section configured to select a P-number of (P is an integer from 1 to M) receiving portions from the M-number of receiving portions when the frame analyzing section of the third wireless communication apparatus discriminates the first frame as a frame directed to the third wireless communication apparatus, wherein, the selecting section of the third wireless communication apparatus controls a power supply of the receiving portions to reduce a power consumption of unselected receiving portions, and to set a selected receiving portion to an operating state after the first frame is received and before the second frame is received, the selecting section of the first wireless communication apparatus controls a power supply of the transmitting portions to reduce a power consumption of unselected transmitting portions, and to set a selected transmitting portion to an operating state, and the selecting section of the third communication apparatus controls the power supply to set one of the receiving portions in an operating state and to reduce a power consumption of the receiving portions other than the one of the receiving portions which is set in the operating state, after a period in which one of the first frame and the third frame inhibits the second wireless communication apparatus from communicating elapses.

11. The apparatus according to claim 10, wherein the J is 1 or M−1.

* * * * *